(12) United States Patent
Forell et al.

(10) Patent No.: US 7,179,133 B2
(45) Date of Patent: Feb. 20, 2007

(54) ATTACHMENT DEVICE FOR THE SUN VISOR OF A MOTOR VEHICLE

(75) Inventors: Richard Forell, Lorsch (DE); Joachim Schneider, Lampertheim (DE); Stefan Glaser, Heppenheim (DE); Joerg Schlinkheider, Ingolstadt (DE)

(73) Assignees: Tyco Electronics AMP GmbH, Bensheim (DE); Audi AG, Ingolstadt (DE)

( * ) Notice: Subject to any disclaimer, the term of this patent is extended or adjusted under 35 U.S.C. 154(b) by 306 days.

(21) Appl. No.: 10/479,130

(22) PCT Filed: May 10, 2002

(86) PCT No.: PCT/EP02/05168

§ 371 (c)(1),
(2), (4) Date: Jul. 27, 2004

(87) PCT Pub. No.: WO02/096689

PCT Pub. Date: Dec. 5, 2002

(65) Prior Publication Data

US 2006/0216956 A1    Sep. 28, 2006

(30) Foreign Application Priority Data

May 29, 2001  (EP) .................................. 01113073

(51) Int. Cl.
*H01R 13/24* (2006.01)

(52) U.S. Cl. ........................ 439/700; 439/824; 439/34; 296/97.1

(58) Field of Classification Search ................ 439/700, 439/824, 34, 289; 296/97.1, 97.12, 97.13
See application file for complete search history.

(56) References Cited

U.S. PATENT DOCUMENTS

| | | | | |
|---|---|---|---|---|
| 5,320,399 A | * | 6/1994 | White et al. | 296/97.12 |
| 5,365,416 A | * | 11/1994 | Peterson | 362/135 |
| 5,848,902 A | * | 12/1998 | Yamaguchi et al. | 439/34 |
| 6,083,059 A | | 7/2000 | Kuan | |
| 6,113,253 A | * | 9/2000 | Yoshii et al. | 362/492 |
| 6,135,610 A | * | 10/2000 | Beck et al. | 362/142 |

(Continued)

FOREIGN PATENT DOCUMENTS

EP          1 089 389 A    4/2001

(Continued)

*Primary Examiner*—Ross Gushi
(74) *Attorney, Agent, or Firm*—Barley Snyder LLC (57) ABSTRACT

The present invention relates to an attachment device (100) for the sun visor of a motor vehicle having a receiving housing (106) mounted on the motor vehicle and a sun visor foot (108) connectable with the sun visor, wherein the receiving housing (106) and the sun visor foot (108) each comprise contacts for producing an electrical connection. The electrical contact of the receiving housing (106) has a first contact point (158) and the electrical contact of the sun visor foot (108) has a second contact point (144) whereby the first contact point (158) and the second contact point (144) are in electrical contact with when the sun visor foot (108) is mounted in the receiving housing (106).

12 Claims, 12 Drawing Sheets

U.S. PATENT DOCUMENTS

| | | | |
|---|---|---|---|
| 6,319,014 B1* | 11/2001 | Gunay et al. | 439/34 |
| 6,354,843 B1* | 3/2002 | Kato | 439/34 |
| 6,488,328 B2* | 12/2002 | Quapil | 296/97.8 |
| 6,524,140 B2* | 2/2003 | Takagi et al. | 439/700 |
| 6,676,129 B2* | 1/2004 | Wilson | 296/97.9 |
| 6,855,010 B1* | 2/2005 | Yen | 439/700 |
| 2001/0012734 A1* | 8/2001 | Nishimatsu | 439/700 |
| 2002/0033614 A1* | 3/2002 | Quapil | 296/97.4 |
| 2002/0123271 A1* | 9/2002 | Henry et al. | 439/700 |
| 2002/0142669 A1* | 10/2002 | Phillips | 439/700 |
| 2005/0101195 A1* | 5/2005 | Zhu et al. | 439/700 |
| 2005/0104409 A1* | 5/2005 | Garcia | 296/97.9 |
| 2005/0237756 A1* | 10/2005 | Ogawa | 362/492 |
| 2006/0079136 A1* | 4/2006 | Wei | 439/700 |
| 2006/0148328 A1* | 7/2006 | Le Gallic | 439/700 |

FOREIGN PATENT DOCUMENTS

| | | |
|---|---|---|
| FR | 2782954 | 3/2000 |
| WO | WO 89/11171 A | 11/1989 |

* cited by examiner

ATTACHMENT DEVICE FOR THE SUN VISOR OF A MOTOR VEHICLE

This application is a National Stage Application filed under 35 U.S.C.§ 371 of PCT/EP02/05168, filed on May 10, 2002, which claims priority of EP Application No. EP01113073.9, filed May 29, 2001.

FIELD OF THE INVENTION

The invention relates to an attachment device for mechanically and electrically connecting a sun visor to a motor vehicle. More particularly, to an attachment device having a receiving housing mounted on the motor vehicle and a sun visor foot connectable with the sun visor, wherein the receiving housing and the sun visor foot each comprise contacts for producing an electrical connection.

BACKGROUND OF THE INVENTION

As part of a progressive increase in the number of electronic components in a motor vehicle, sun visors are more frequently being manufactured with electronic components. Not only are the sun visors being used as a support for additional operating and display elements (e.g., video displays), but the functioning of the sun visor itself is also being controlled by electronic components. For example, the position of the sun visor may be set by sensors, actuators and control electronics in response to a measured glare.

Because of these developments, when the sun visor is attached to the motor vehicle during manufacture, electrical contact between connections provided on the motor vehicle and connections extending out of the sun visor need to be provided in addition to mechanical coupling and fixing. Common attachment devices provided for the electrical connection of the motor vehicle to the sun visor have a loosely suspended plug-in connector for producing an electrical coupling in addition to mechanical attachment of the sun visor. Moreover, an arrangement for attaching a vehicle sun visor to a bodywork component is known from European patent EP 0 808 251 B1, wherein electrical contact is produced between electrical connectors arranged on a mounting clip and associated electrical connectors on a plastic insert.

A disadvantage of these attachment devices is that producing the electrical contact requires an additional, often relatively time-consuming, mounting step and additional components.

It is therefore desirable to provide an attachment device for a sun visor of a motor vehicle wherein electrical contact is effectuated in the same working step as the mechanical coupling so that the sun visor is attached in a particularly simple, economic manner with as few mounting steps as possible.

SUMMARY OF THE INVENTION

This object is achieved by an attachment device for the sun visor of a motor vehicle having a receiving housing mounted on the motor vehicle and a sun visor foot connectable with the sun visor, wherein the receiving housing and the sun visor foot each comprise contacts for producing an electrical connection. The electrical contact of the receiving housing has a first contact point and the electrical contact of the sun visor foot has a second contact point whereby the first contact point and the second contact point are in electrical contact with when the sun visor foot is mounted in the receiving housing.

BRIEF DESCRIPTION OF THE DRAWINGS

The invention is explained in more detail below with reference to the attached drawings, wherein:

FIG. 28 is a side view of the contact housing of six-pole construction;

FIG. 29 is a sectional view along line D—D of FIG. 32;

FIG. 30 is a side view of the contact housing of six-pole construction;

FIG. 31 is a sectional view along line E—E of FIG. 32;

FIG. 32 is a plan view of the contact housing of six-pole construction;

FIG. 33 is a sectional view along line F—F of FIG. 32;

DETAILED DESCRIPTION OF THE PREFERRED EMBODIMENT

Preferred configurations of the invention are described in more detail below. Similar or matching details of the attachment device according to the invention are provided with the same reference numerals in the Figures. FIGS. 1 to 5 show an attachment device 100 for a motor vehicle sun visor. The attachment device 100 comprises a metal sheet 104, a receiving housing 106 and a sun visor foot 108.

Figure 13:
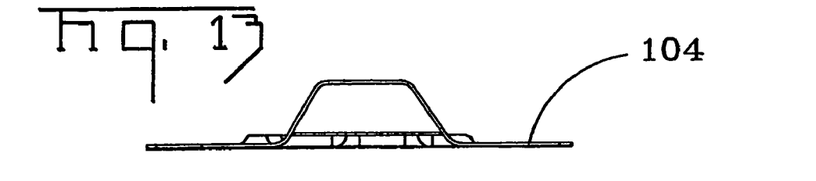
FIG. 13 is a side view of a sheet metal cutout on a motor vehicle for a receiving housing.
Figure 14:
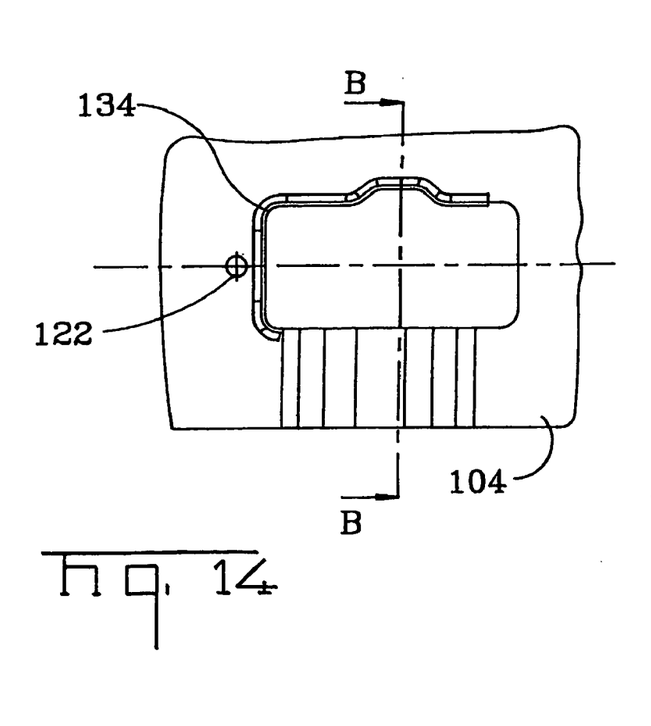
FIG. 14 is a plan view of the sheet metal cutout of FIG. 13.
Figure 15:
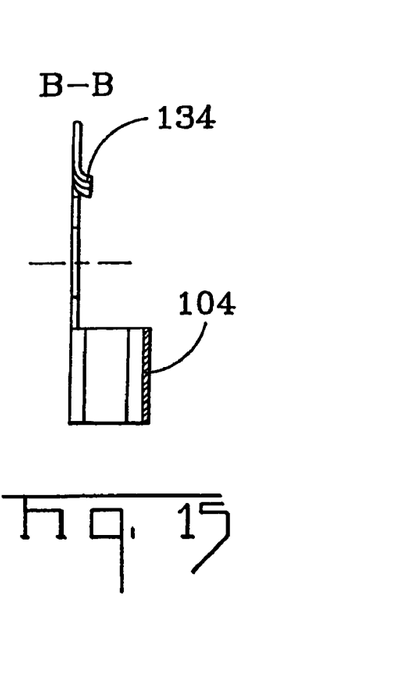
FIG. 15 is a sectional view along line B—B of FIG. 14.
Figure 16:
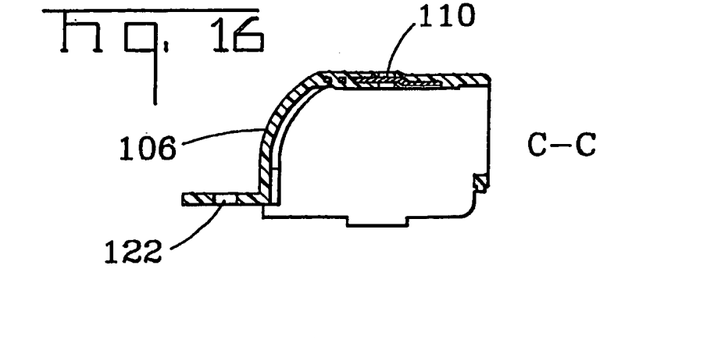
FIG. 16 is a sectional view along line C—C of FIG. 21.
Figure 17:
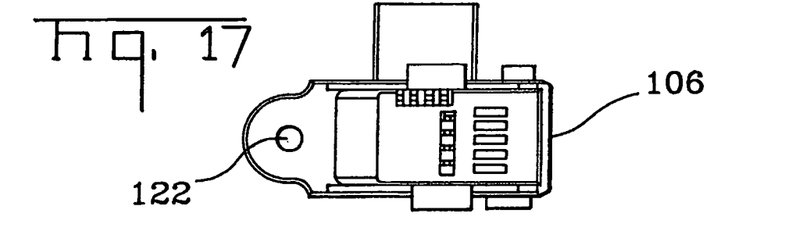
FIG. 17 is a plan view of the receiving housing of five-pole construction.
Figure 18:
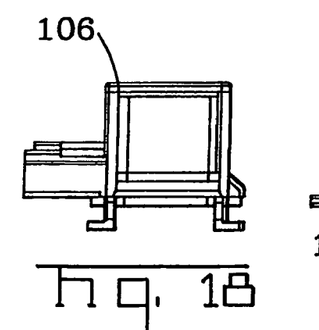
FIG. 18 is a side view of a first side of the receiving housing of five-pole construction.
Figure 19:
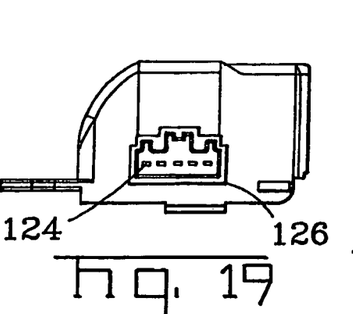
FIG. 19 is a side view of a second side of the receiving housing of five-pole construction.
Figure 20:
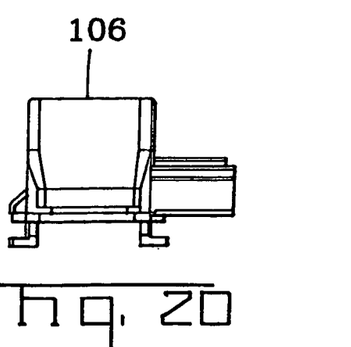
FIG. 20 is a side view of a third side of the receiving housing of five-pole construction.

The metal sheet 104 will now be described in greater detail. Shown in FIGS. 13 to 15, the metal sheet 104 has a cut-out provided for the receiving housing 106. An edge of the cut-out in the metal sheet 104 has a rounded bent-up portion 134 to simplify installation of the receiving housing 106. Essentially parallel to the cut-out, the metal sheet is formed to have a receptacle 128. Adjacent the rounded bent-up portion 134 is a bore 122. Although the metal sheet 104 illustrated is manufactured from a metallic material, another material such as plastic can be used to obtain substantially similar results.

Figure 1:
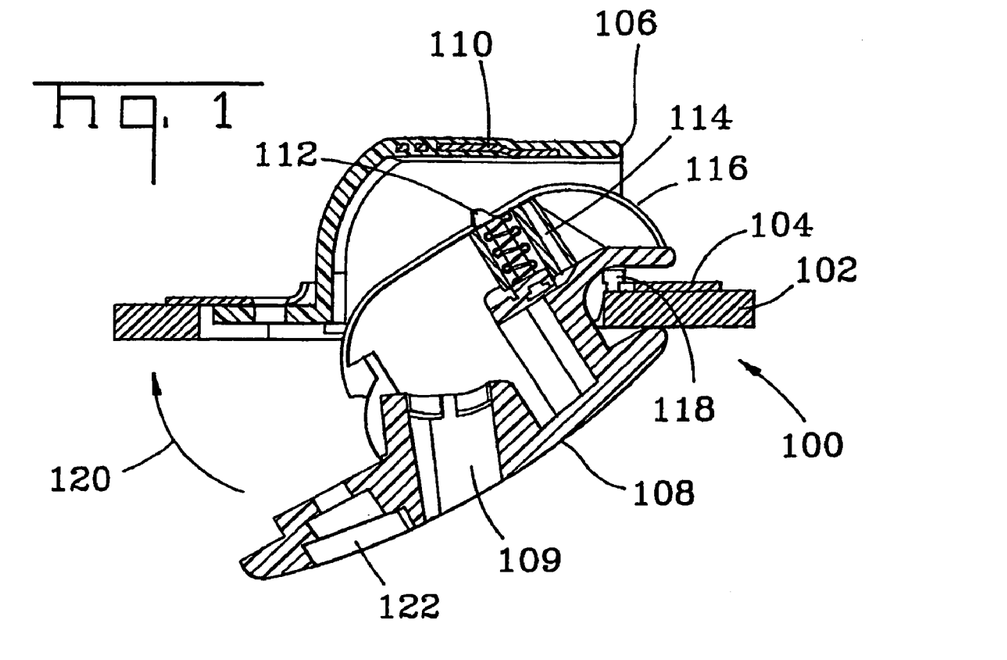
FIG. 1 is a sectional view of an attachment device of five-pole construction during the mounting process.
Figure 2:
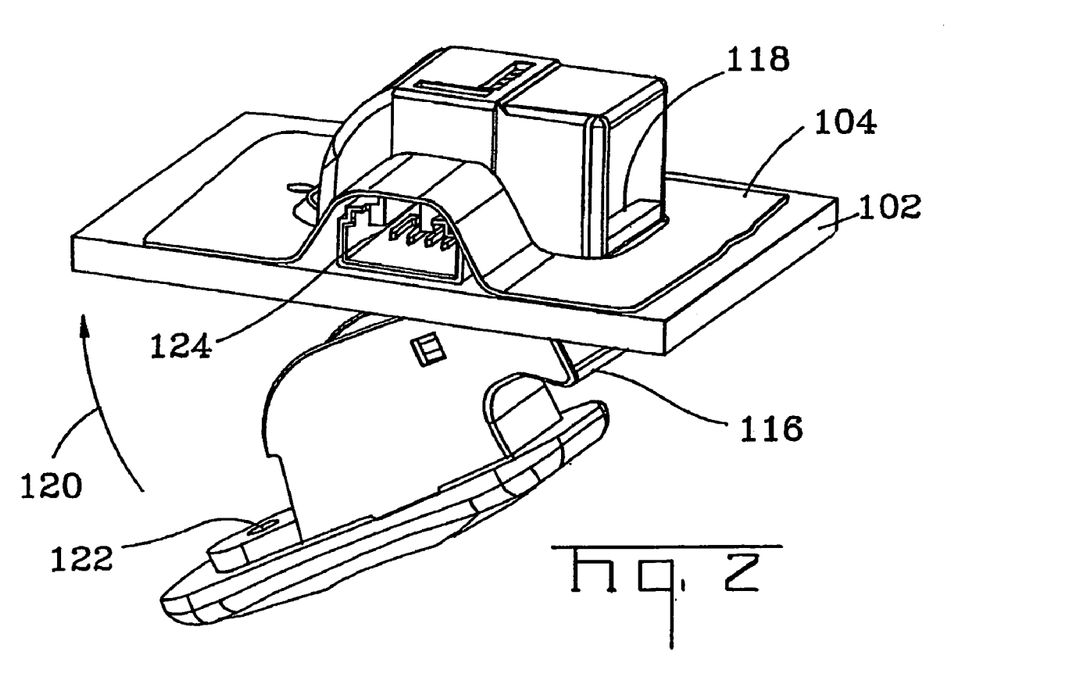
FIG. 2 is a perspective view of the attachment device of five-pole construction during the mounting process.
Figure 3:
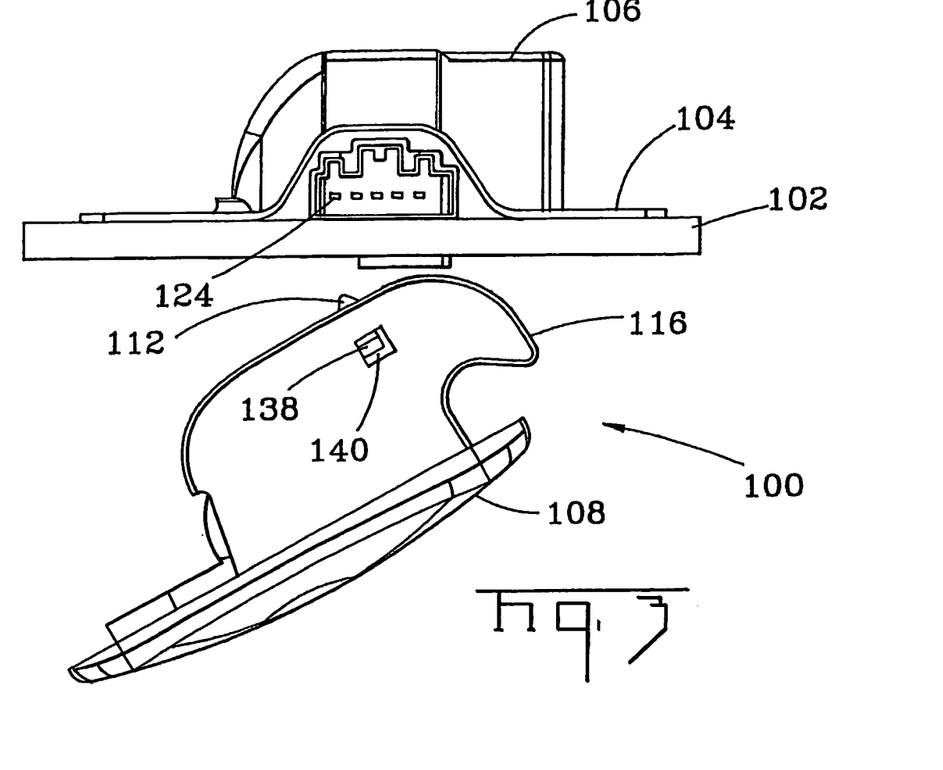
FIG. 3 is a side view of the attachment device of five-pole construction during the mounting process.
Figure 12:
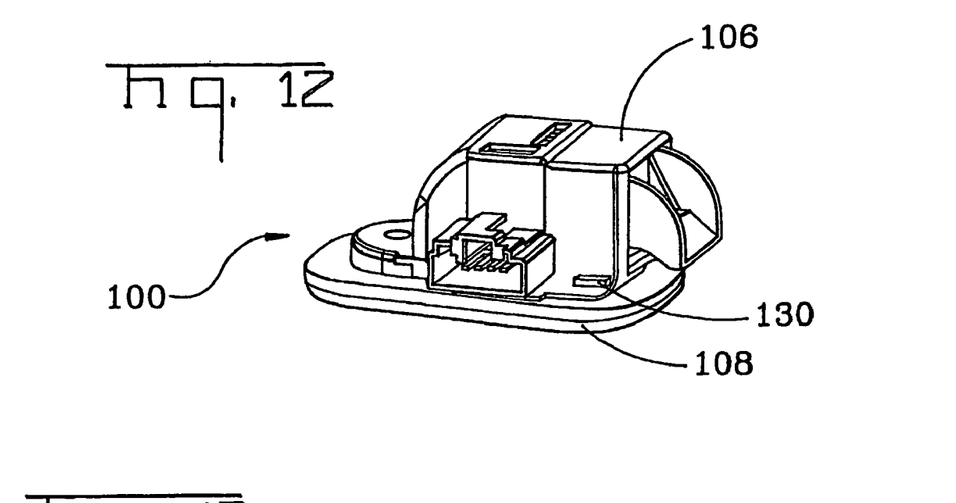
FIG. 12 is a perspective view of a third side of the mounted attachment device of five-pole construction.
Figure 21:
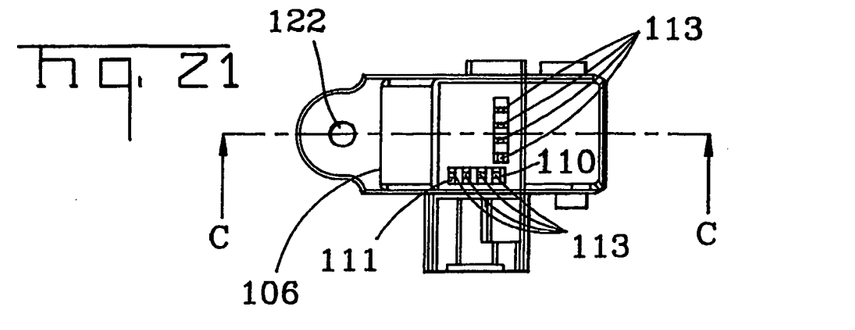
FIG. 21 is a plan view of an underside of the receiving housing.
Figures 22, 24:
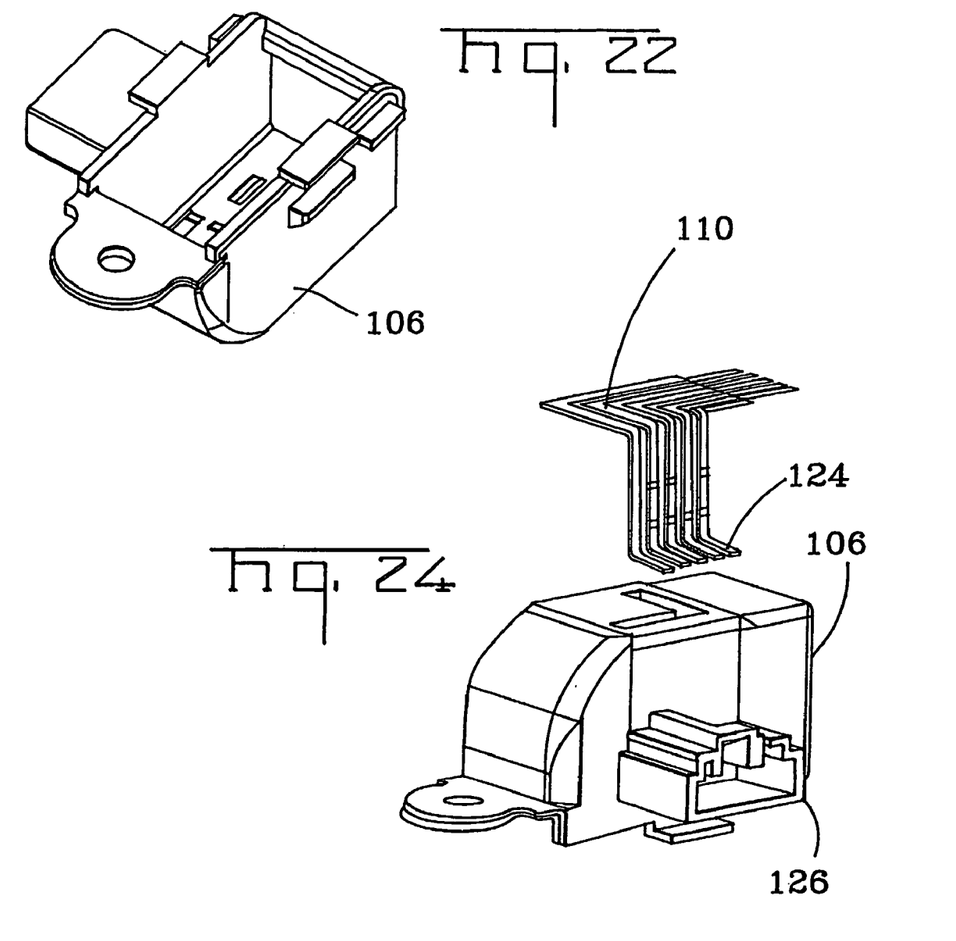
FIG. 22 is a perspective view of a bottom of the receiving housing of five-pole construction.
FIG. 24 is a perspective view of the receiving housing of five-pole construction showing a stamped grid in a detached state.
Figure 23:
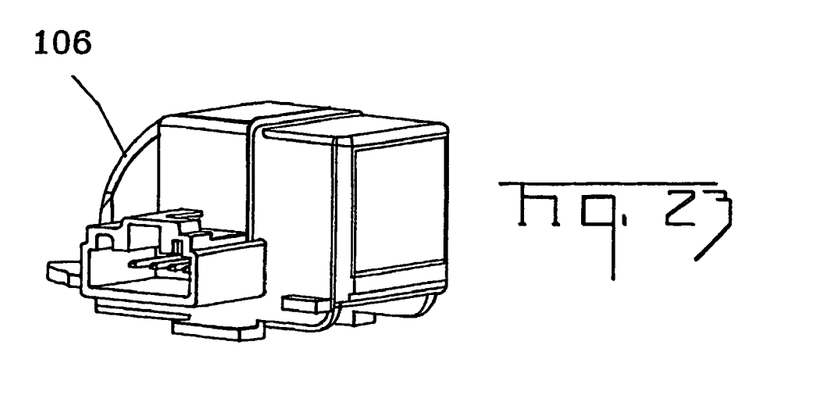
FIG. 23 is a perspective view of the receiving housing of five-pole construction.

The receiving housing 106 will now be described in greater detail. As shown in FIGS. 21 to 22, the receiving housing 106 has a projection having a bore 122. As shown in FIGS. 1 and 12, a limit stop 130 can be provided on the receiving housing 106 adjacent a bearing surface 118 to prevent the hook 116 from being pushed too far through the receiving housing 106 when the hook 116 is engaged in the receiving housing 106, as shown in FIG. 1.

Shown in FIGS. 16 to 23 and 38 to 44, the stamped grid 110 is embedded by injection moulding and has individual conductive tracks 111 connected into a network by webs 113. The webs 113 are necessary for embedding a plurality of parallel conductive tracks in the receiving housing 106 by injection moulding in one working step. The conductive tracks 111 have a contact zone 158 at a first end that is provided for connection with compression spring contacts 112. At a second end, the conductive tracks 111 comprise a connection zone 160, forming connections 124 for electrical connection with the motor vehicle. The conductive tracks 111 remain connected by the webs 113 until encapsulated by injection moulding in the receiving housing 106. After embedding by injection moulding, the webs 113 are separated to ensure electrical isolation of the conductive tracks from one another. The webs 113 may be removed after the injection process through openings in the plastics of the receiving housing 106.

The contact zones 158 of the conductive tracks 111 are preferably gold-plated to ensure particularly good electrical crossover to the compression spring contact 112. The connection zone 160 is tinned, as is conventional for the contact pins of a plug-in connector. The area 164 is preferably completely tinned.

In FIG. 24 the stamped grid 110 is shown in the detached position next to the receiving housing 106. The connections 124 extend outwards at the side face of the receiving housing 106 and form plug-in connector 126 for electrical connection with the motor vehicle. In the embodiment shown, the plug-in connector has five poles. Although five poles are illustrated, the plug-in connector may have any number of poles suitable for a given purpose.

Figures 25, 26, 27:
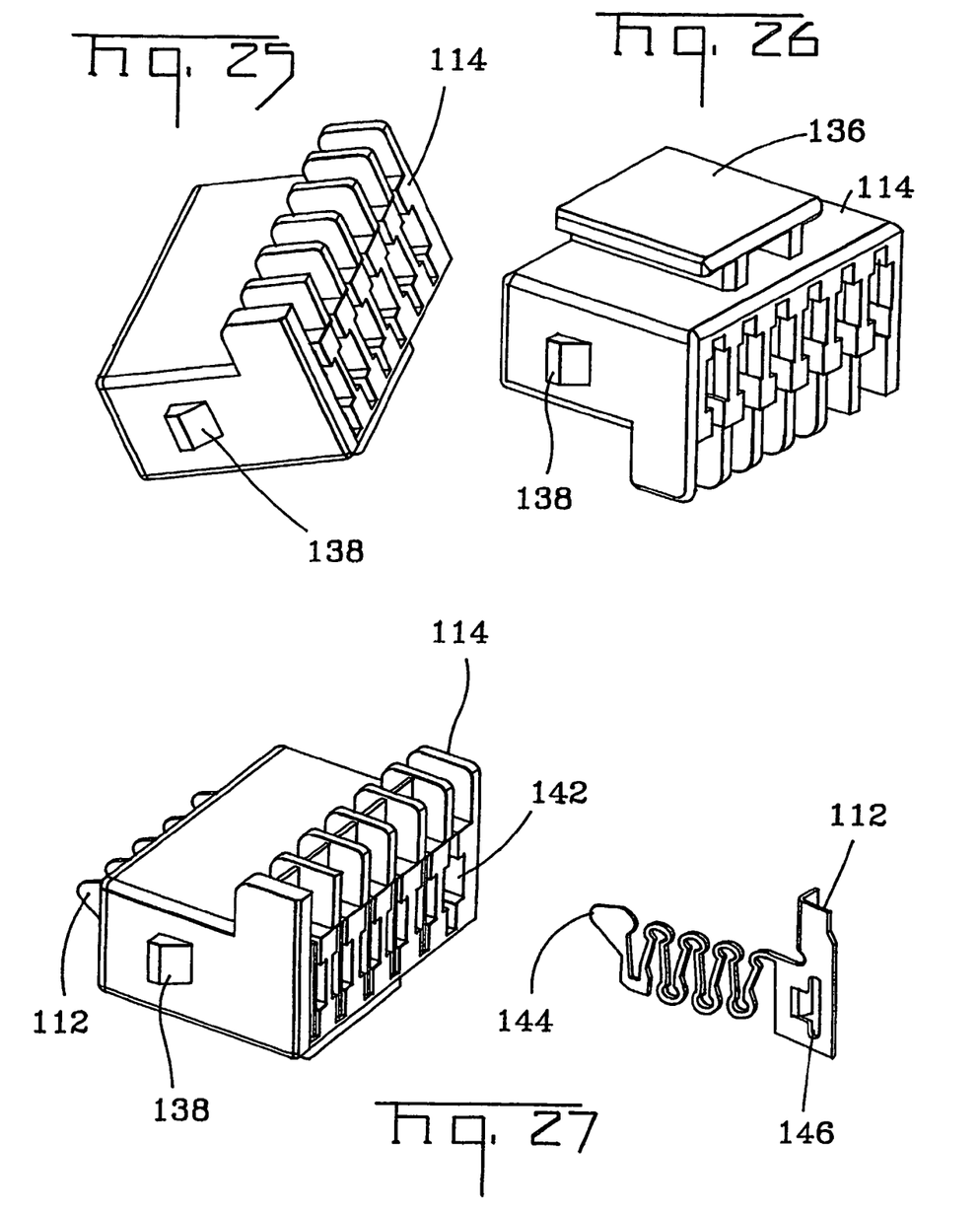
FIG. 25 is a perspective view of a six-pole contact housing.
FIG. 26 is a perspective view of the six-pole contact housing.
FIG. 27 is a perspective view of the contact housing of six-pole construction during mounting of a compression spring contact.

Shown in FIG. 1, the sun visor foot 108 will now be described in greater detail. The sun visor foot 108 has a hook 116, a contact housing 114, and compression spring contacts 112. Shown in FIGS. 25 to 27, the contact housing 114 has snap-in lugs 138 and a guide profile 136. The snap in lugs 138 are provided on a side face to hold the contact housing 114 securely in the sun visor foot 108 by interacting with corresponding snap-in openings 140 on an outer surface of the sun visor foot 108, shown in FIG. 3. The guide profile 136 projects from a side of the contact housing 114 and is guided and held in a corresponding guide channel on the receiving housing 106. The contact housing 114 is preferably made of injected moulded plastic, but other materials may be used to obtain substantially similar results.

Figures 34, 35, 36, 37:
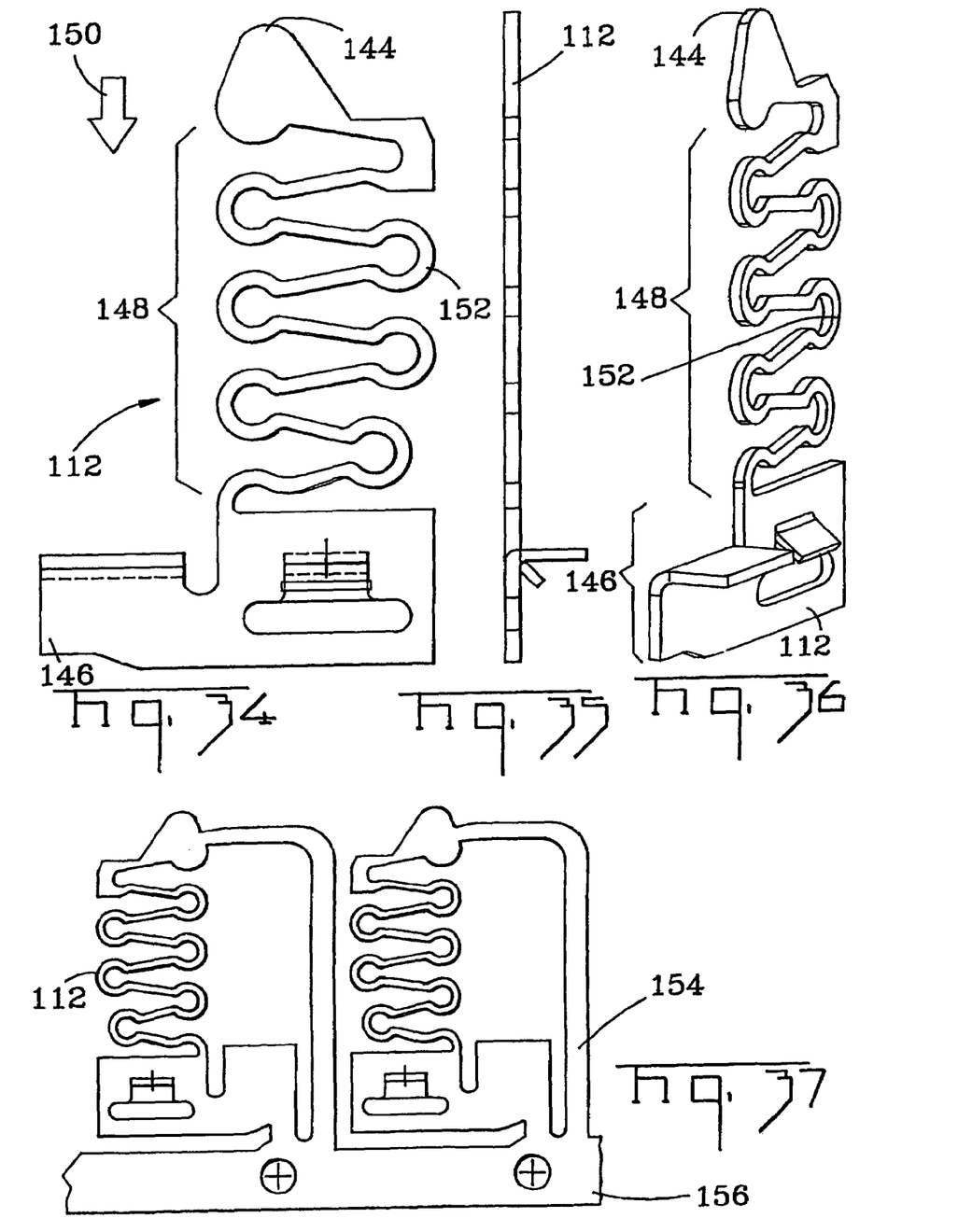
FIG. 34 is a plan view of a compression spring contact.
FIG. 35 is a side view of the compression spring contact.
FIG. 36 is a perspective view of the compression spring contact.
FIG. 37 is a plan view of a stamping strip layout for the compression spring contact.
Figure 38:
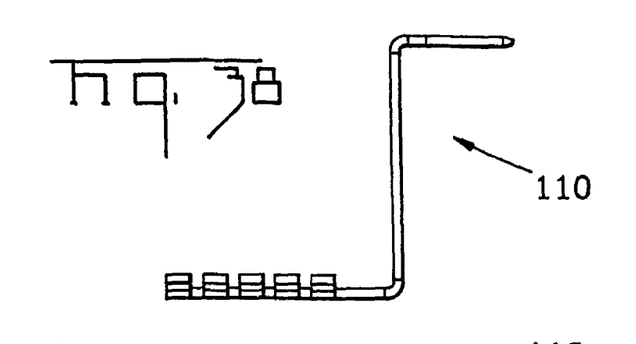
FIG. 38 is a side view of the stamped grid.
Figure 39:
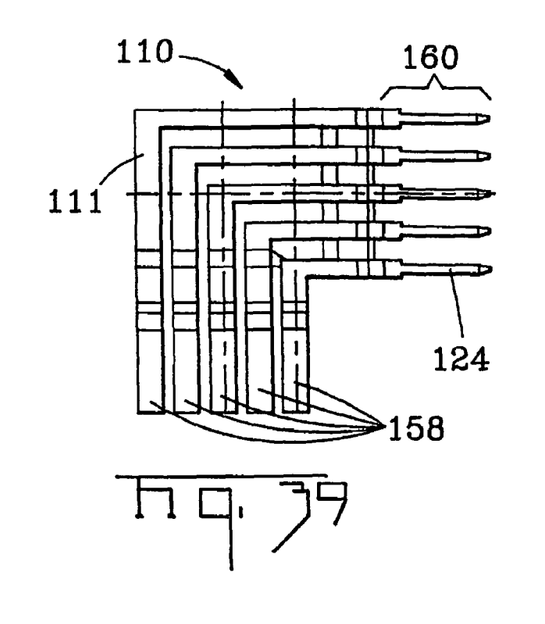
FIG. 39 is a plan view of the stamped grid.
Figure 40:
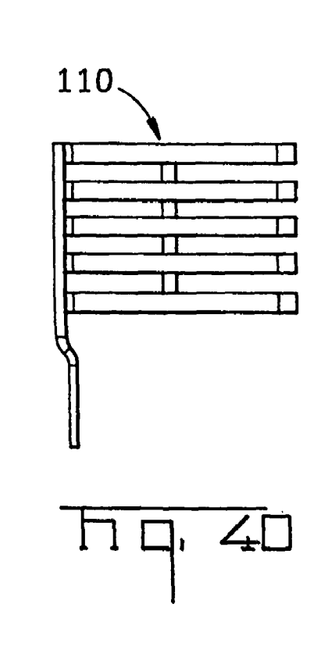
FIG. 40 is a side view of the stamped grid.
Figure 41:
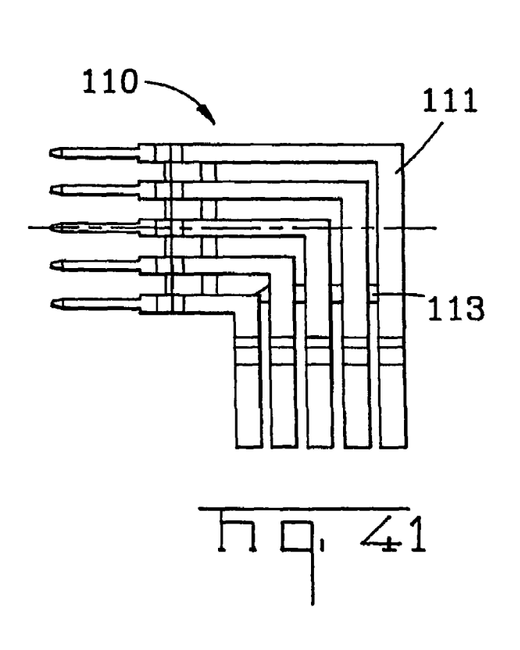
FIG. 41 is a side view of the stamped grid.
Figures 42, 43:
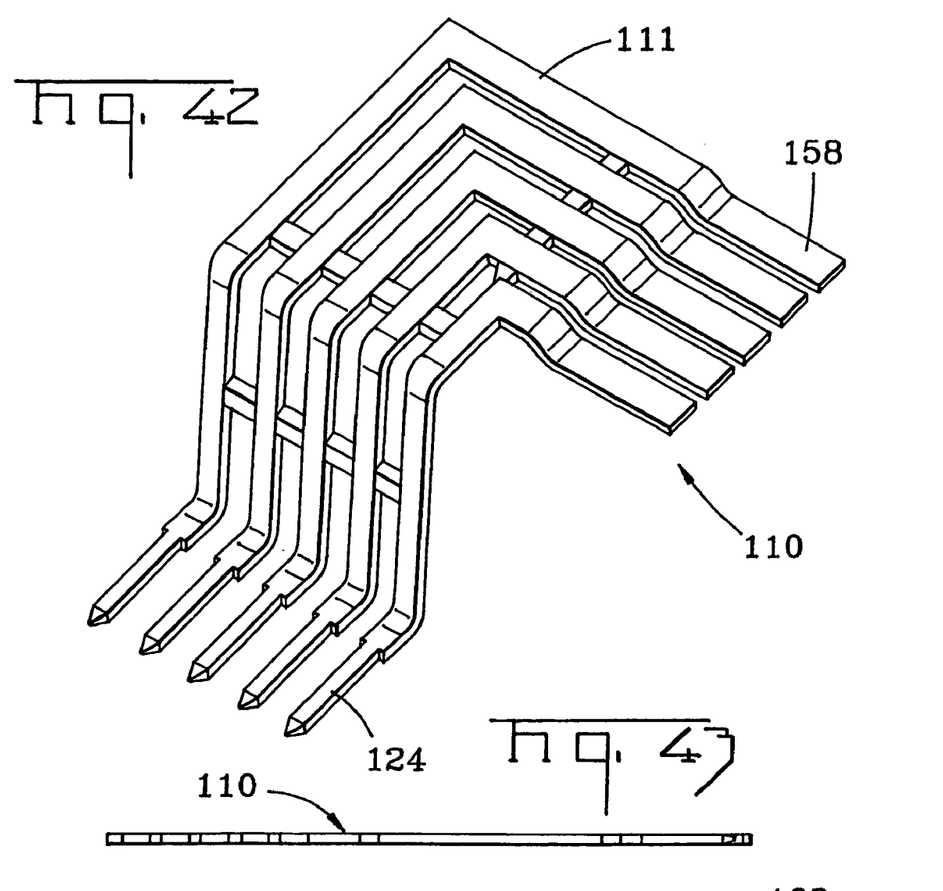
FIG. 42 is a perspective view of the stamped grid of five-pole construction.
FIG. 43 is a side view of the stamping strip layout for the stamped grid.
Figure 44:
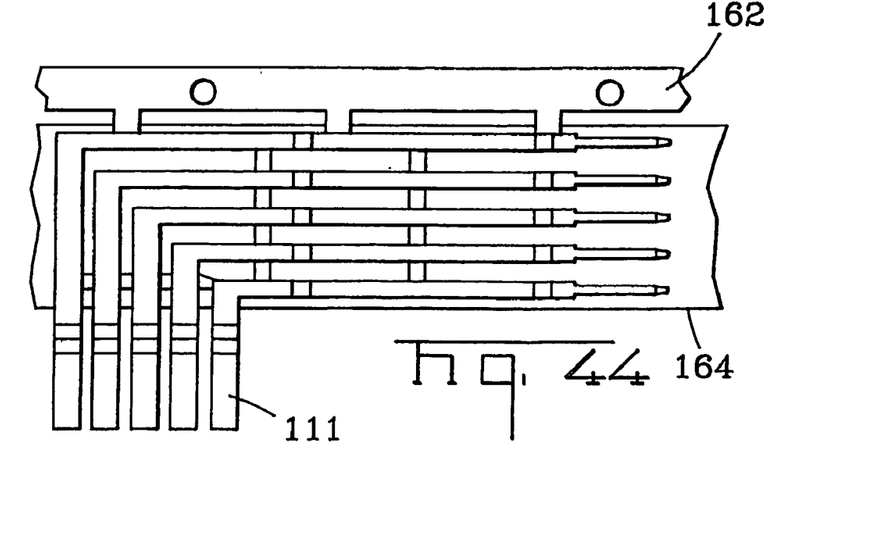
FIG. 44 is a plan view of the layout of the stamped grid.

The compression spring contact 112 is shown in various views in FIGS. 34 to 36. The compression spring contact 112 has a resilient zone 148 cut in a zigzag pattern next to a contact zone 144 and a connection zone 146. By applying mechanical pressure, which acts on the compression spring contact 112 in the direction 150, the latter may be resiliently deformed. The resilience is further increased by radii 152, which are provided at the respective turning points of the zigzagging resilient zone 148.

A portion of the stamping strip from which the compression spring contacts 112 are made is shown in FIG. 37. Webs 154 and 156 are removed and singulated after stamping and bending of the compression spring contacts 112. The connection zone 146 of the compression spring contact 112 is preferably coppered to a layer thickness of 3 to 5 μm. A cobalt-gold layer at least 1.2 μm thick may be applied in the contact zone 144 to achieve better contact with the conductive tracks 111 of the connection housing.

The contact housing 114, holds and insulates the compression spring contacts 112 in a six pole embodiment. Although a six pole embodiment is illustrated, an embodiment with any number of poles is possible. FIGS. 28 to 33 show different views and sectional images of the contact housing 114 in a six-pole embodiment. The contact housing 114 may also already be equipped with compression spring contacts 112 in the delivery state.

Figure 4:
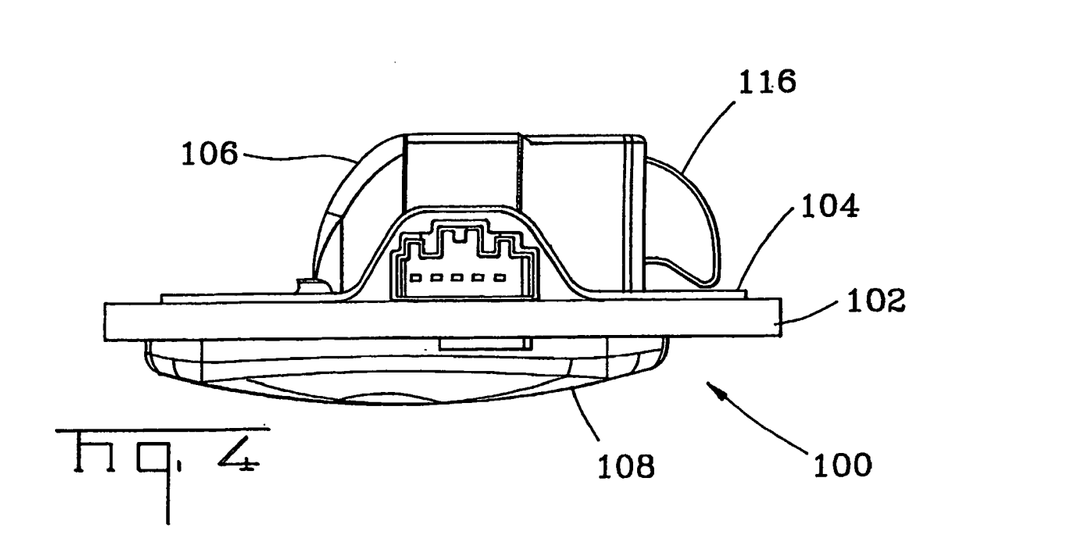
FIG. 4 is a side view of the attachment device of five-pole construction in a mounted state.
Figure 5:
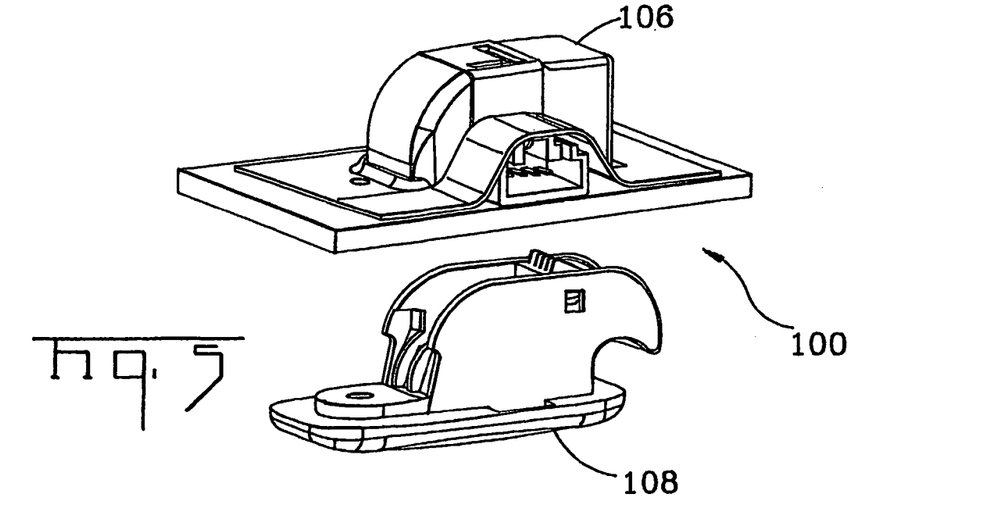
FIG. 5 is a perspective view of the attachment device of five-pole construction prior to mounting.

The mounting procedure of the sun visor foot 108 to the receiving housing 106 will now be described in greater detail. Shown in FIGS. 1 to 4, the receiving housing 106 is received in the cut-out of the metal sheet 104 attached to an inner roof lining 102 of the motor vehicle. The sun visor foot 108 is mounted by introducing the hook 116 into the receiving housing 106 by a tilting movement in the direction represented by arrow 120. The hook 116 is positioned on the bearing surface 118. As shown in FIG. 4, the sun visor foot 108 may be inserted into the receiving housing 106 such that only a very small amount of space is taken up by the sun visor foot 108 in the passenger compartment.

Figure 6:
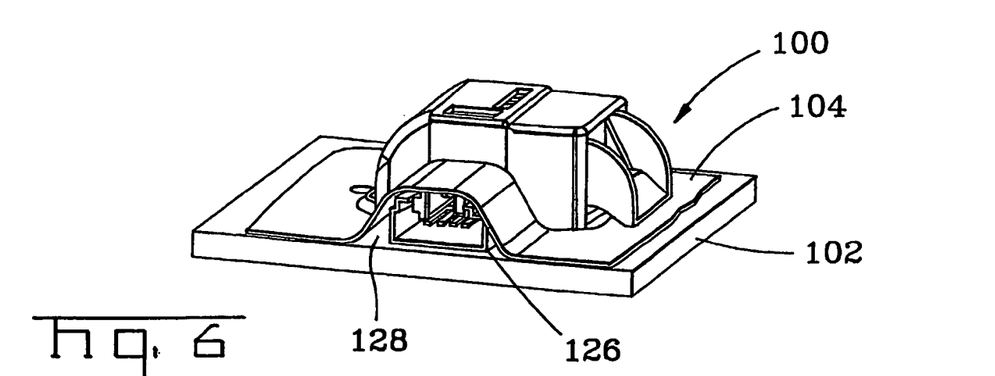
FIG. 6 is a perspective view of a first side of the attachment device of five-pole construction in the mounted state.
Figure 7:
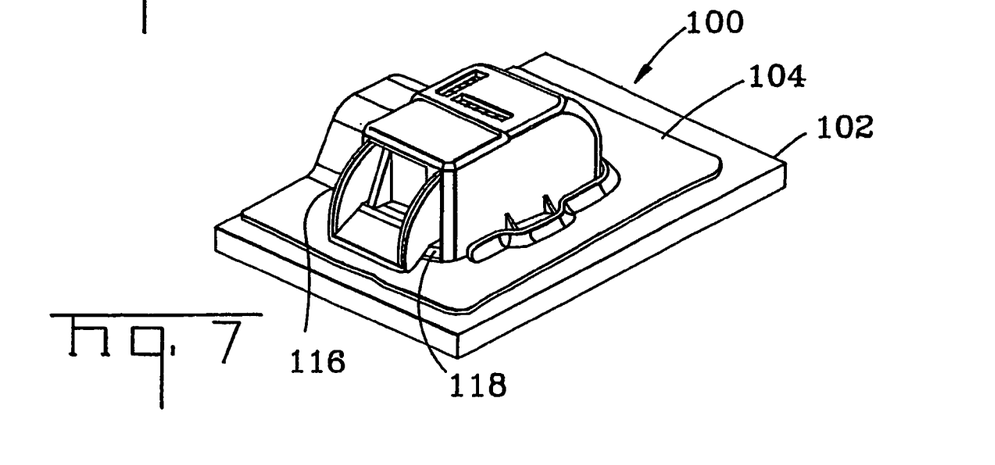
FIG. 7 is a perspective view of a second side of the attachment device of five-pole construction in the mounted state.
Figures 8, 9, 10:
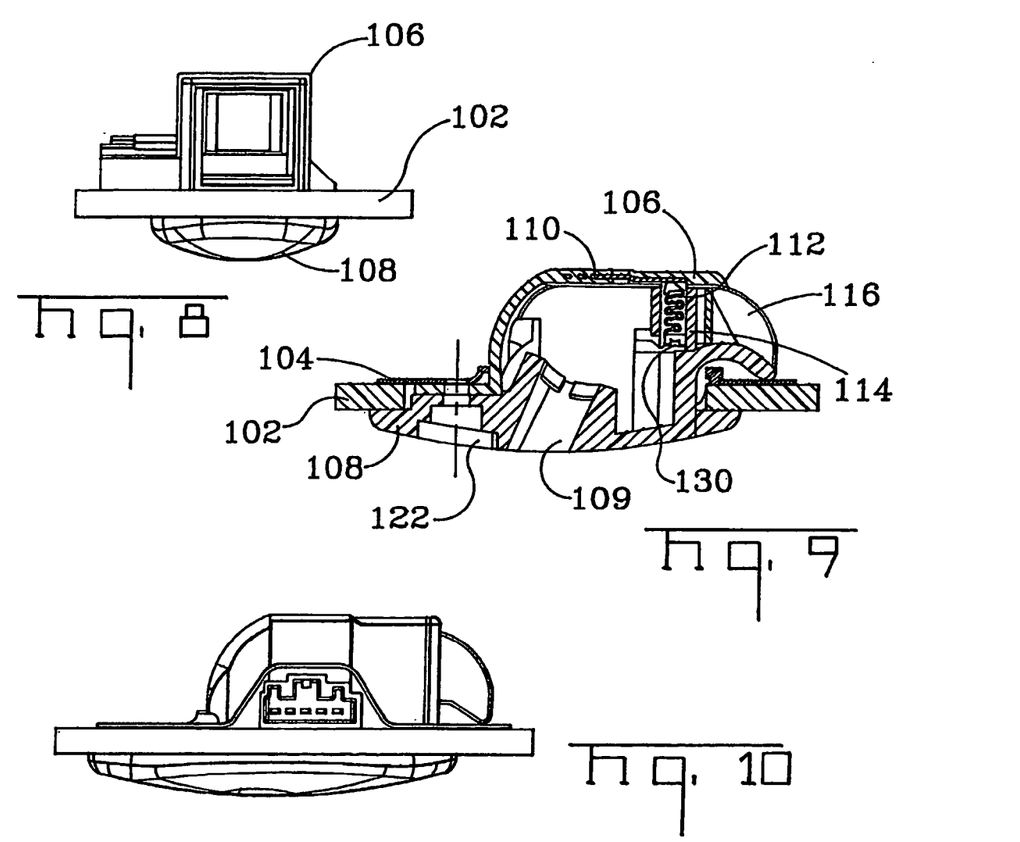
FIG. 8 is a side view of a first side of the mounted attachment device of five-pole construction.
FIG. 9 is a sectional view along Line A—A of FIG. 11.
FIG. 10 is a side view of a second side of the mounted attachment device of five-pole construction.
Figure 11:
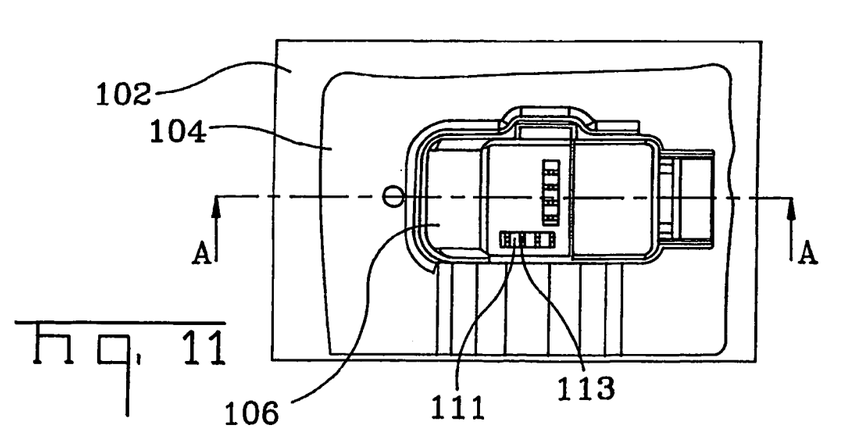
FIG. 11 is a plan view of the attachment device of five-pole construction in the mounted state.

In swivelling the sun visor foot 108 into the receiving housing 106, the compression spring contacts 112 are received into the corresponding receptacles 142 in the contact housing 114. In the mounted state, the ends of the contact zones 144 of the compression spring contacts 112 project out of the contact housing 114 and are pressed against the conductive tracks 111 of the stamped grid 110 and fixed by axial pressure. Connecting cables (not shown) extend out of the sun visor and may be connected to the connection zone 146 of the compression spring contacts 112. During this process, the electrical contact between the stamped grid 110 and the compression spring contacts 112 is closed in a self-adjusting manner. The sun visor foot 108 is mechanically fixed to the releasing housing 106 via a screw (not shown) that extends through the bores 122 provided in the metal sheet 104 and the releasing housing 106. As shown in FIGS. 6 and 7, the plug-in connector 126 with the conductive track connections 124 is embedded in the receptacle 128 in the metal sheet 104, such that cables may be connected which run between the inner roof lining 102 and the metal sheet 104.

In the attachment device 100, the receiving housing 106 mechanically fixes and electrically contacts the sun visor foot 108. In the mounted state, compression spring contacts 112 of the sun visor foot 108 contact free contact surfaces on a stamped grid 110. The stamped grid 110 is embedded in the receiving housing 106 by injection moulding. An arm of the sun visor (not shown) is mechanically fixed in a receptacle 109 having electrical connections (not shown) extending therefrom. Thus, an attachment device for a sun visor of a motor vehicle is provided wherein electrical contact is effectuated in the same working step as the mechanical coupling so that the sun visor is attached in a particularly simple and economical manner with as few mounting steps as possible.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

We claim:

1. An attachment device for a sun visor of a motor vehicle, comprising:
   a receiving housing mounted on the motor vehicle,
   a sun visor foot connectable with the sun visor;
   an attachment mechanism producing a releasable mechanical coupling between the receiving housing and the sun visor foot;
   an electrical contact disposed on the receiving housing and comprising a planar conductive track exposed at a contact zone having a first contact point thereon; and
   an electrical contact disposed on the sun visor foot and having a second contact point formed by a protrusion configured to be brought into electrical contact with the conductive track by butt contact;
   wherein the first and second contact points are in electrical contact with one another when the sun visor foot is in a mounted state in the receiving housing; and
   wherein the conductive track comprises a stamping embedded in the receiving housing.

2. The attachment device according to claim 1, wherein the protrusion is adapted to be pressed against the conductive track in a direction essentially perpendicular to the conductive track in the mounted state.

3. The attachment device according to claim 1, wherein the conductive track is embedded in the receiving housing by injection moulding.

4. The attachment device according to claim 1, wherein the sun visor foot is substantially surrounded by the receiving housing.

5. The attachment device according to claim 1, wherein the attachment mechanism comprises at least one screw connection between the receiving housing and the sun visor foot.

6. An attachment device for a sun visor of a motor vehicle, comprising:
   a receiving housing mounted on the motor vehicle,
   a sun visor foot connectable with the sun visor;
   an attachment mechanism producing a releasable mechanical coupling between the receiving housing and the sun visor foot;
   an electrical contact disposed on the receiving housing and comprising a planar conductive track exposed at a contact zone having a first contact point thereon; and
   an electrical contact disposed on the sun visor foot and having a second contact point formed by a protrusion configured to be brought into electrical contact with the conductive track by butt contact;
   wherein the first and second contact points are in electrical contact with one another when the sun visor foot is in a mounted state in the receiving housing; and
   wherein the conductive track comprises a connection zone extending out of the receiving housing to make contact with an electrical connection of the motor vehicle.

7. An attachment device for a sun visor of a motor vehicle, comprising:
   a receiving housing mounted on the motor vehicle,
   a sun visor foot connectable with the sun visor;
   an attachment mechanism producing a releasable mechanical coupling between the receiving housing and the sun visor foot;
   an electrical contact disposed on the receiving housing and comprising a planar conductive track exposed at a contact zone having a first contact point thereon; and
   an electrical contact disposed on the sun visor foot and having a second contact point formed by a protrusion configured to be brought into electrical contact with the conductive track by butt contact;
   wherein the first and second contact points are in electrical contact with one another when the sun visor foot is in a mounted state in the receiving housing; and
   wherein the electrical contact disposed on the sun visor foot is biased by a compression spring.

8. The attachment device according to claim 7, wherein the compression spring and the electrical contact disposed on the sun visor foot are an integrally formed stamping cut into a zigzag and resiliently deformable by axial pressure on an end face thereof.

9. The attachment device according to claim 7, wherein the electrical contact disposed on the sun visor foot comprises a contact zone and a connection zone, and the connection zone is configured for connecting a cable therewith.

10. The attachment device according to claim 7, wherein the sun visor foot comprises a receptacle, configured to at least partially receive a contact housing adapted to hold the contact biased by the compression spring.

11. The attachment device according to claim 10, wherein the contact housing comprises snap-in members and the sun visor foot comprises snap-in openings, whereby the contact housing is fixed to the receptacle of the sun visor foot by snapping the snap-in members into the snap-in openings.

12. An attachment device for a sun visor of a motor vehicle, comprising:
  a receiving housing mounted on the motor vehicle,
  a sun visor foot connectable with the sun visor;
  an attachment mechanism producing a releasable mechanical coupling between the receiving housing and the sun visor foot;
  an electrical contact disposed on the receiving housing and comprising a planar conductive track exposed at a contact zone having a first contact point thereon; and
  an electrical contact disposed on the sun visor foot and having a second contact point formed by a protrusion configured to be brought into electrical contact with the conductive track by butt contact;
wherein the first and second contact points are in electrical contact with one another when the sun visor foot is in a mounted state in the receiving housing; and
wherein the attachment mechanism comprises a bearing surface disposed on the receiving housing, and at least one hook on the sun visor foot engaging the bearing surface.

* * * * *